(12) United States Patent
Larcom et al.

(10) Patent No.: US 8,663,535 B2
(45) Date of Patent: Mar. 4, 2014

(54) INTEGRATED SUNSHADE DESIGN

(75) Inventors: Ryan V. Larcom, Greenwood, IN (US); Brian D. Large, Columbus, OH (US); Rachel E. Canepa, Marysville, OH (US); Shinichi Yamase, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 385 days.

(21) Appl. No.: 13/162,598

(22) Filed: Jun. 17, 2011

(65) Prior Publication Data

US 2012/0319427 A1 Dec. 20, 2012

(51) Int. Cl.
*B29C 45/00* (2006.01)

(52) U.S. Cl.
USPC ............... 264/319; 264/328.1; 264/328.7

(58) Field of Classification Search
USPC ................... 264/319, 328.1, 328.7
See application file for complete search history.

(56) References Cited

U.S. PATENT DOCUMENTS

| | | | |
|---|---|---|---|
| 5,089,912 A | 2/1992 | Simin | |
| 5,605,370 A | 2/1997 | Ruiz | |
| 6,508,967 B2 | 1/2003 | Visconti et al. | |
| 6,681,832 B1 | 1/2004 | Procida et al. | |
| 7,013,946 B2 | 3/2006 | Beck et al. | |
| 7,401,840 B2 | 7/2008 | Schnoblen et al. | |
| 7,475,935 B2 | 1/2009 | Ercolano | |
| 2004/0017023 A1 | 1/2004 | Schoemann | |
| 2009/0205792 A1 | 8/2009 | Brendel et al. | |

FOREIGN PATENT DOCUMENTS

| | | |
|---|---|---|
| EP | 0985567 | 2/2004 |
| WO | WO 2005-021231 | 3/2005 |

OTHER PUBLICATIONS

PCT/US2012/042623 Search Report.

*Primary Examiner* — James Sanders
(74) *Attorney, Agent, or Firm* — Fay Sharpe LLP

(57) ABSTRACT

A trim panel for a door of a vehicle that wherein both sunshade and non-sunshade versions of the trim panel are manufactured on the same equipment, thus eliminating the need to prepare separate molds for each trim panel. Both the sunshade and non-sunshade versions of the trim panel share essentially the same components and dimension except that the sunshade trim panel has an upper surface that terminates prior to a corresponding surface of the non-sunshade trim panel. This feature allows both trim panels to be made on the same equipment and then installed as needed depending on whether a given door will include a sunshade assembly.

13 Claims, 5 Drawing Sheets

INTEGRATED SUNSHADE DESIGN

BACKGROUND

This disclosure relates to a sunshade assembly for a vehicle and, more particularly to a retractable sunshade assembly for shading a window of a vehicle. For purposes of this application, a sunshade is a screen (often retractable) that is typically used to shade a rear window associated with a rear seat while a sun visor is mounted in front of the driver and/or front seat passenger.

A basic sunshade assembly may generally include a sunshade screen mounted on a retractable roller, and at least one hook or other attachment mechanism for securing the sunscreen in a deployed position for shading a window. The roller is often recessed within an upper portion of a door or adjacent side panel of the vehicle, and concealed from view by a trim panel. The trim panel often has a slit through which the sunshade extends when being deployed or detracted from the roller.

For a given vehicle, an auto manufacturer often may equip only certain models with sunshades. For example, a base model vehicle may not include window shades, whereas a luxury model will typically include the feature. Other vehicles, such as fleet vehicles, also typically may not include sunshades. Providing some vehicles with sunshades and some without generally requires a manufacturer to source separate trim panels for each configuration in order to maintain a high level of fit and finish. For example, a trim panel for a vehicle including a sunshade will include the slit through which the sunshade passes while a trim panel for a base model not having a sunshade would not have the slit. Other design differences may exist such as, for example, the trim panel for a vehicle with a sunshade may be a different shape or have different fastening points (e.g., screw bosses, etc.) to accommodate the roller.

While providing separate trim panels results in a vehicle with a high level of fit and finish, it also increases costs to the manufacturer. These costs are in part the result of designing two separate panels and preparing separate molds to manufacture the different panels.

BRIEF DESCRIPTION

A trim panel design for a trim panel of a door of a vehicle is disclosed that allows both sunshade and non-sunshade versions of the trim panel to be manufactured on the same equipment, thus eliminating the need to prepare separate molds for each trim panel. More particularly, a method of making a trim panel for an automobile door including a sunshade and a trim panel for an automobile door not including a sunshade, each of the panels made on the same equipment, comprises the steps of (i) molding a non-sunshade trim panel using a plastic mold apparatus having a hydraulic slide in a retracted position, the first trim panel having a body with first and second ends, a door side surface extending between the first and second ends, and a door upper surface extending away from the door side surface, (ii) advancing the hydraulic slide to an extended position for producing a sunshade trim panel, (iii) molding a sunshade trim panel using the plastic mold apparatus with the hydraulic slide in the extended position, the sunshade trim panel having a body with first and second ends, a door side surface extending between the first and second ends, and a door upper surface extending away from the door side surface, (iv) wherein the door upper panel of the non-sunshade trim panel extends further from the door side surface than does the door upper surface of the sunshade trim panel.

The method can further include the step of applying a topcoat to at least one of the non-sunshade trim panel and the sunshade trim panel using a vacuforming press. The same vacuforming press can be used to apply the topcoat to both the non-sunshade and sunshade trim panels. The method can further include the step of trimming a free end of the topcoat and securing the free end of the topcoat to the trim panel. The method can also include the step of selecting one of the sunshade trim panel or the non sunshade trim panel for installation on a door of a vehicle based on whether a sunshade is to be installed on the door. A non-sunshade trim panel and a sunshade trim panel made by the above described method are also disclosed, as well as a door of a vehicle including a non-sunshade trim panel or a sunshade trim panel made by the above-described method.

In accordance with another aspect, a method of forming either a non-sunshade trim panel or a sunshade trim panel using the same equipment, wherein both trim panels have a body with first and second ends, a door side surface extending between the first and second ends, and a door upper surface extending away from the door side surface, the door upper surface of the non-sunshade trim panel extending further from the door side surface than the door upper surface of the sunshade trim panel is provided. The method comprises the steps of (i) selecting either a non-sunshade trim panel or a sunshade trim panel for manufacture, (ii) positioning a hydraulic slide of a molding press in a first or second position corresponding to the selected sunshade, (iii) molding the selected sunshade, (iv) applying a topcoat to the molded sunshade using a vacuum form press, the vacuum form press adapted to apply a topcoat to either of a non-sunshade trim panel or a sunshade trim panel, (v) trimming a free end of the topcoat to a desired length, (vi) and securing the free end of the topcoat to the molded trim panel.

The method can further include molding the selected sunshade via injection molding using an injection molding machine. The step of applying the top coat can include applying a foam layer and a vinyl layer to the molded sunshade. A non-sunshade trim panel and a sunshade trim panel made by this method are also disclosed.

DETAILED DESCRIPTION

Figure 1:
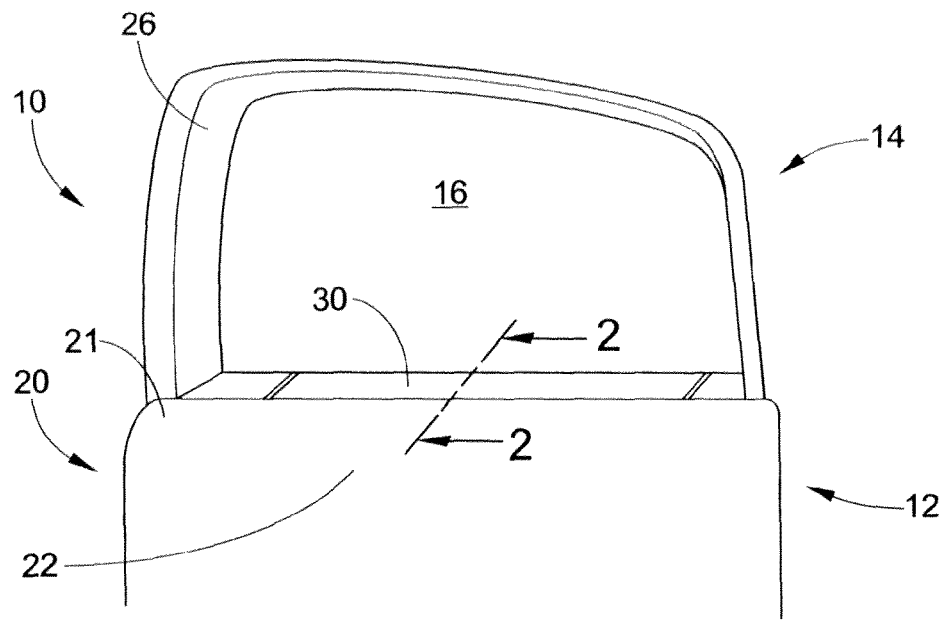
FIG. 1 is an exemplary door of an automobile including a trim panel in accordance with the present disclosure.

With reference to FIG. 1, an exemplary door 10 for an automobile is illustrated. The door 10 generally includes a lower door portion 12 and an upper window portion 14. As will be appreciated, the lower door portion 12 is typically hingedly attached to a body structure of a vehicle for opening and closing to allow occupants to enter and exit the vehicle. The upper window portion 14 of the door 10 generally includes a window 16 supported within the door 10 for movement between a closed position where the window 16 is received within the frame of the upper window portion 14 of the door 10, to a retracted position whereat the window 16 is retracted into the lower portion 12 of the door 10. Various trim panels are provided on the door for concealing components mounted within the door (e.g., window mechanism, lock mechanism, etc). As will be appreciated in the illustrated embodiment, a sunshade trim panel 20 in accordance with the present disclosure is shown mounted to the lower portion 12 of the door 10 along with a sunshade assembly 30. The sunshade trim panel 20 includes a door upper surface 21 and a door side panel portion 22. One or more sash garnishes 26 are provided for trimming out the upper portion 14 of the door 10.

Figure 2:
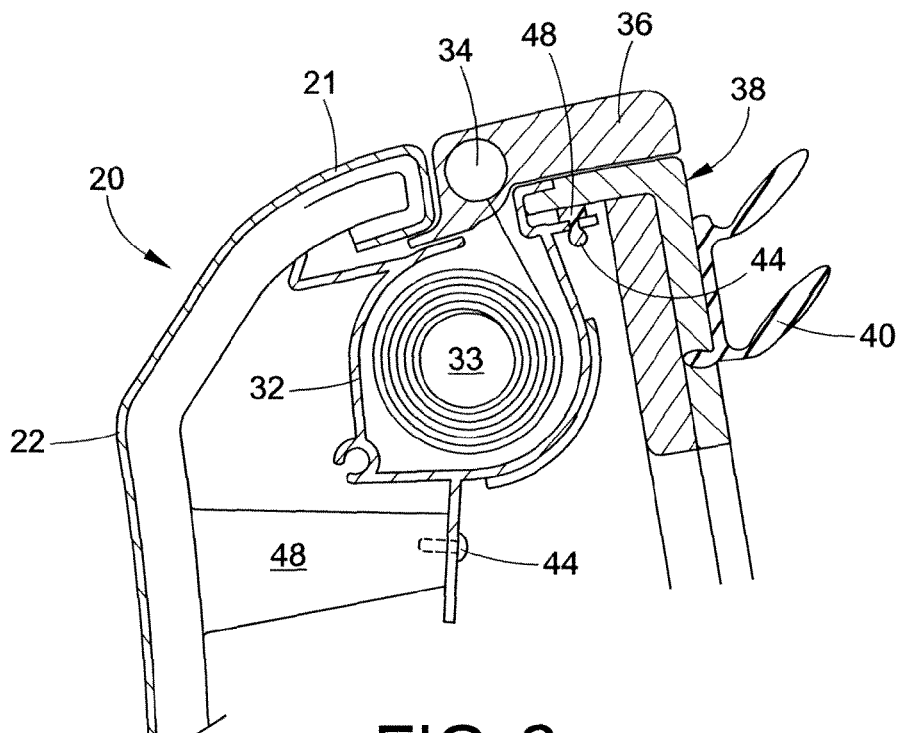
FIG. 2 is a cross-sectional view taken along the line 2-2 in FIG. 1.

Turning now to FIG. 2, which is a cross-sectional view taken along the line 2-2 in FIG. 1, the details of the sunshade assembly 30 and sunshade trim panel 20 will be described. The sunshade assembly 30 generally includes a housing 32 for supporting a sunshade 33 on a retractable roller (not shown). A leading edge of the sunshade 33 is connected to a finisher 34 which can include a hook and/or handle 36 designed to be secured to a corresponding hook or hook retainer (not shown) provided at the top of door 10 adjacent the window 16, or in a trim panel adjacent the top of the door.

In the retracted position shown in FIG. 2, the sunshade 33 is stowed within the housing 32 and the finisher 34 and handle 36 are generally flush with an upper surface of the door, thereby providing a uniform and aesthetically pleasing design. It will be appreciated that any suitable sunshade assembly 30 can be used with aspects of the present disclosure, and other components can be provided on the door 10 and/or adjacent to the sunshade assembly 30 as is conventional. For example, a weather strip flange 38 may be installed between the sunshade assembly 30 and outer surface of the door 10. Weather stripping 40 may be secured to the weather strip flange 38 for sealing the window 16 to prevent water and other contaminants from entering into the interior of the vehicle and/or interior of the door 10. The sunshade assembly 30 is generally mounted to the door 10 or trim panels associated therewith via one or more screws 44 or other fasteners that are inserted through holes in various positions and secured to respective screw bosses 48, for example. In this regard, the sunshade trim panel 20 includes upper and lower screw bosses 48 for securing respective sides of the sunshade assembly 30 to the trim panel 20. The screw bosses 48 can be molded together with the sunshade trim panel 20 as a unitary piece, for example.

Figure 3:
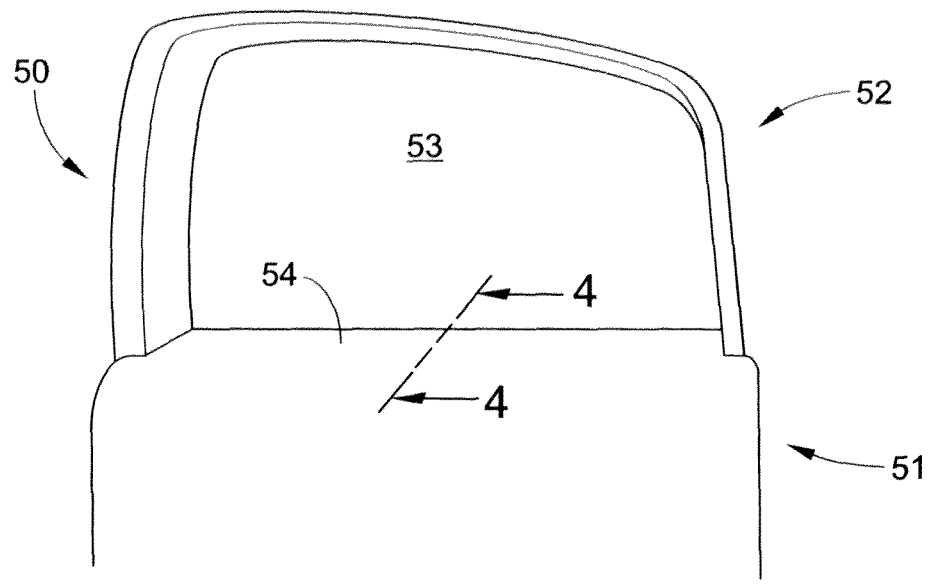
FIG. 3 is another exemplary door of an automobile including a trim panel in accordance with the present disclosure.
Figure 4:
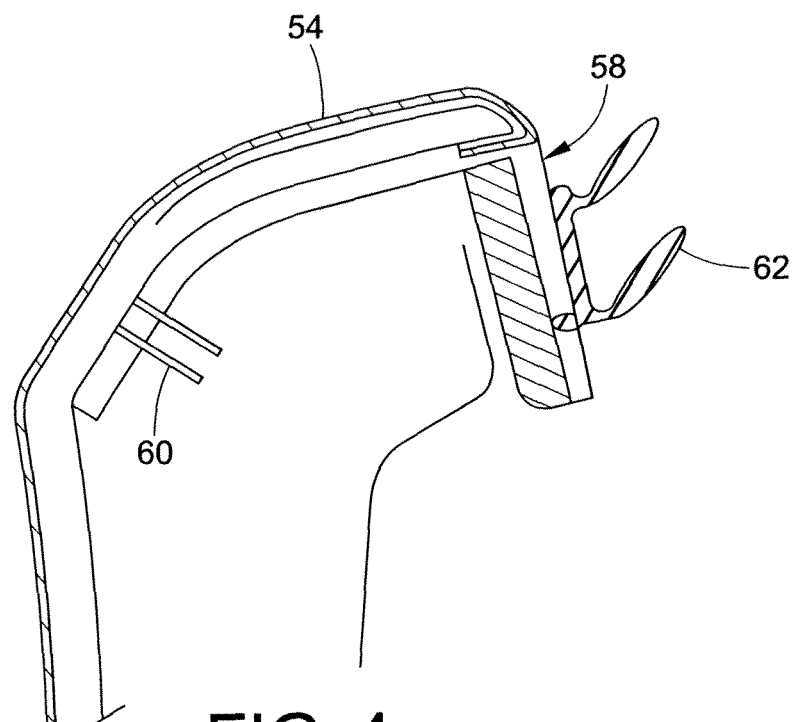
FIG. 4 is a cross-sectional view taken along the line 4-4 in FIG. 3.

With reference to FIGS. 3 and 4, another exemplary door is illustrated and generally defined by reference numeral 50. The door 50 is generally identical to the door 10 shown in FIG. 1, and includes a lower portion 51, an upper portion 52, and a window 53. Door 50, however, does not include a sunshade assembly 30. As will be appreciated, a non-sunshade trim panel 54 covers the door upper surface and differs slightly from the trim panel 20 shown in FIGS. 1 and 2.

In FIG. 4, which is a cross-section taken through the line 4-4 in FIG. 3, the details of trim panel 54 are illustrated. As compared to the sunshade trim panel 20 in FIGS. 1 and 2, it will be appreciated that the non-sunshade trim panel 54 has a door upper surface 56 that extends further from the door side surface, generally terminating near the edge of the door by the weather stripping (e.g., closer to the window 53 (not shown in FIG. 4)). Other than the different dimensions of the door upper surface of the trim panels 20 and 54, the trim panels are generally otherwise identical. As with the assembly shown in FIGS. 1 and 2, a weather strip flange 58 is secured to the trim panel 54 (via a heat stake 60 or the like) and a weather strip 62 is mounted to the weather strip flange 58 for sealing against a surface of the window 53. In accordance with the present disclosure, the trim panel 54 can be produced using the same equipment as the trim panel 20, as will now be described.

Figure 5:
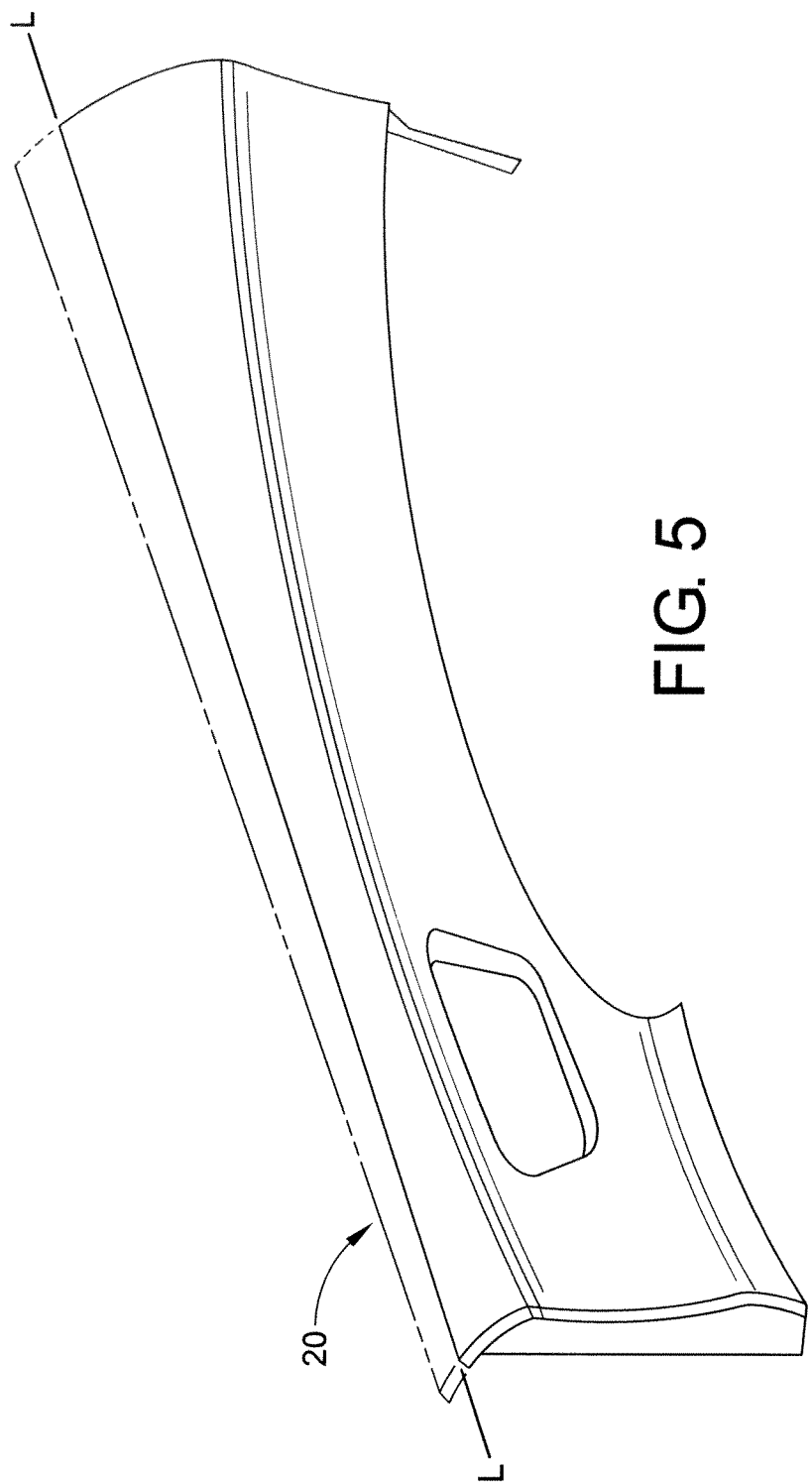
FIG. 5 is a perspective view of an exemplary trim panel in accordance with the present disclosure.

Turning to FIG. 5, an exemplary non-sunshade trim panel 20 in accordance with the present disclosure is shown with a line L on an upper surface thereof indicating an edge of a sunshade version of the trim panel (e.g., sunshade trim panel 54). The line L denoting the edge of the sunshade trim panel indicates the position at which an edge of the material forming a sunshade trim panel 54 would terminate. Thus, as can now be seen, the non-sunshade trim panel 20 and the sunshade trim panel 54 are essentially identical in all respects except for the extent of the upper surface 21 thereof, with the edge of the sunshade trim panel 54 not extending as far as the edge of the non-sunshade trim panel 20.

Figure 6:
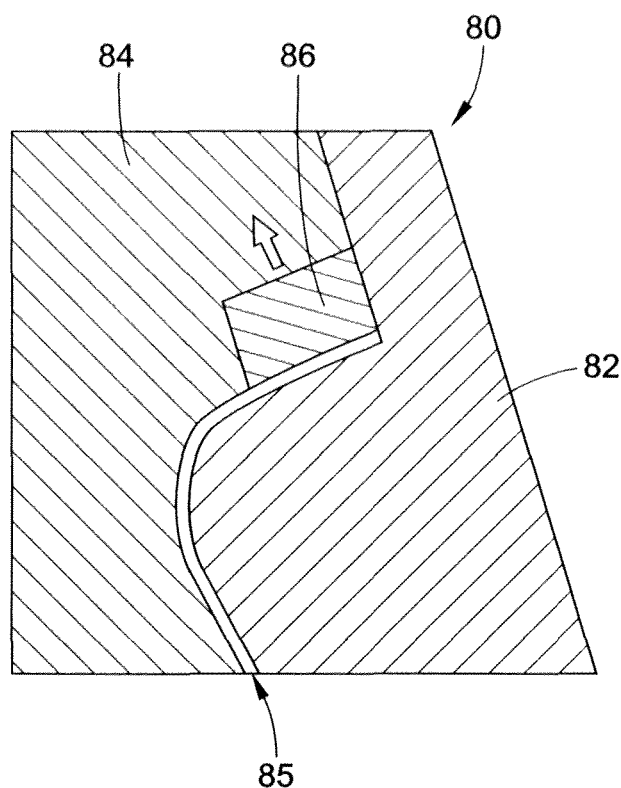
FIG. 6 is a schematic illustration of a plastic molding press including a hydraulic slide in a first position for forming a non-sunshade trim panel in accordance with the present disclosure.

In accordance with the present disclosure, the two different sunshade trim panels 20 and 54 can be made from the same tooling thus simplifying parts sourcing and reducing costs. With reference to FIG. 6, an exemplary plastic molding device 80 is illustrated having a core 82 and a cavity 84. The core 82 and the cavity 84 together define a mold chamber 85 into which plastic can be injected for forming a trim panel. A hydraulic slide 86 is supported for movement between first and second positions to change dimensions of the mold chamber 85 such that either the non-sunshade trim panel 20 or the sunshade trim panel 54 can be produced from the same mold 80. In FIG. 6, the hydraulic slide 86 is shown in a retracted position such that the mold chamber extends to an end point at the core 82. As will be appreciated, this mold chamber 85 configuration corresponds to a mold for a non-sunshade trim panel 20.

Figure 7:
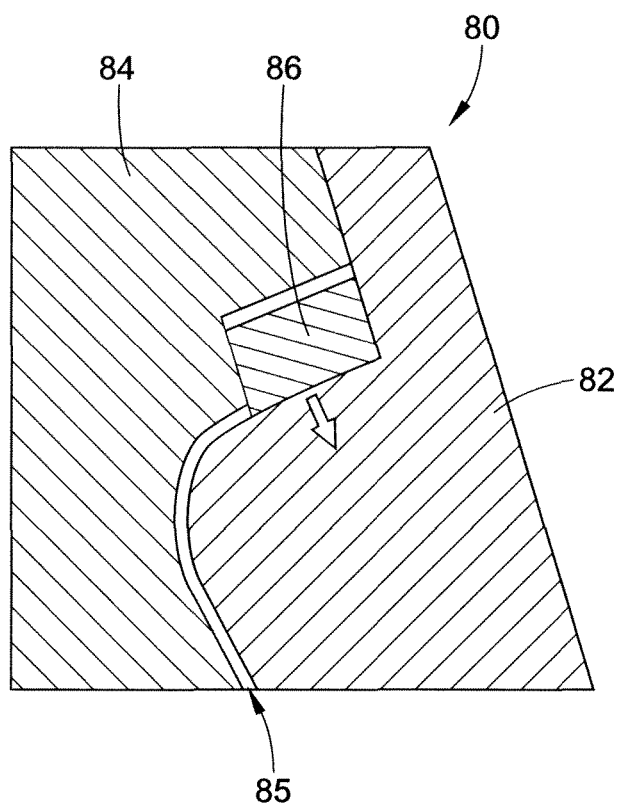
FIG. 7 is a schematic illustration of a plastic molding press including a hydraulic slide in a second position for forming a sunshade trim panel in accordance with the present disclosure.

Turning to FIG. 7, the hydraulic slide 84 is shown in an advanced position thereby prematurely terminating the mold chamber 85 as compared to the configuration of the mold chamber in FIG. 6. This mold chamber configuration corresponds to a mold for the sunshade trim panel 54 wherein the upper surface has less areal extent. As will be appreciated, the molding device 80 described above is merely exemplary in nature and other molding device types can be used to produce the respective trim panels.

Regardless of whether a non-sunshade trim panel 20 or a sunshade trim panel 54 is produced, either panel can then be passed through a vacuum forming machine for applying a topcoat to the respective trim panel. The topcoat can generally be any automotive type topcoat including, for example, a vinyl layer stretched over a foam layer giving the outer surface of the trim panel a soft and refined look and feel.

Figure 8:
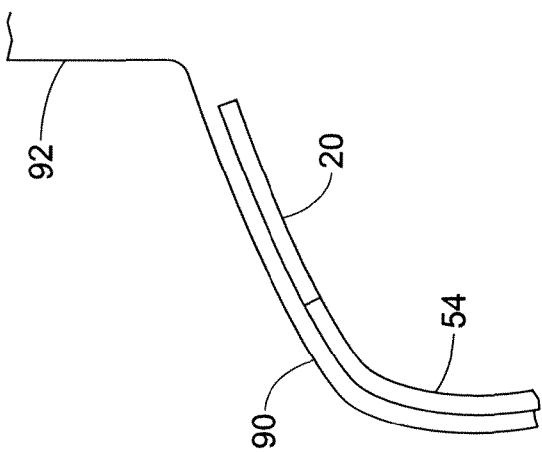
FIG. 8 is an end view of a vac-formed topcoat applied to a trim panel (non-sunshade or sunshade) in accordance with the present disclosure.

Accordingly, with reference to FIG. 8, a vacuum formed topcoat 90 is applied to either the non-sunshade trim panel 20 or the sunshade trim panel 54 via conventional methods (e.g., vacuforming). Depending on which trim panel is placed in the vacuum forming machine, the free end 92 of the topcoat 90 will extend beyond the terminal edge of the trim panel. In order to ensure proper fit and finish of the topcoat 90, separate trim blades can be used to trim the topcoat 90 depending on which trim panel is being produced. Alternatively, a single trim blade can be repositioned to ensure proper trimming of the topcoat 90.

Figure 10:
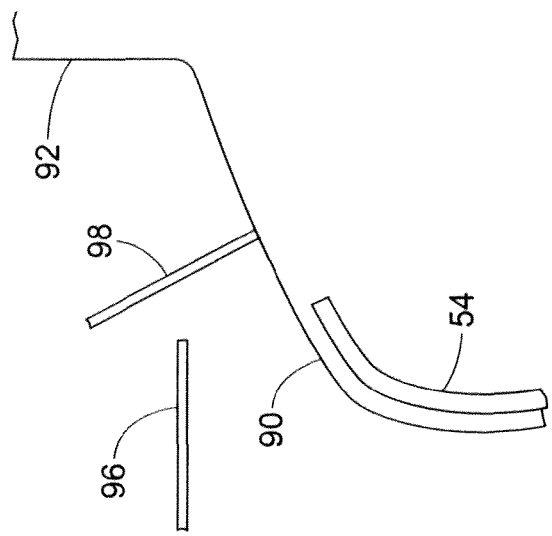
FIG. 10 is a schematic illustration of a trim blade for trimming a topcoat applied to a sunshade trim panel in accordance with the present disclosure.
Figure 9:
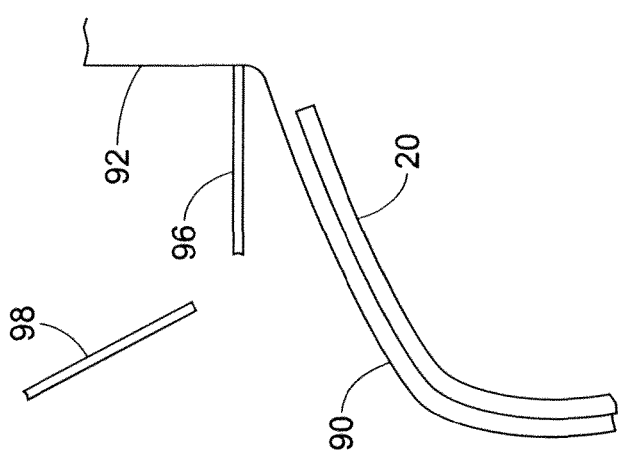
FIG. 9 is a schematic illustration of a trim blade for trimming a topcoat applied to a non-sunshade trim panel in accordance with the present disclosure.

Turning to FIGS. 9 and 10 and initially to FIG. 9, a first trim blade 96 is shown for trimming a topcoat 90 that has been applied to a non-sunshade trim panel 20. The trim blade 96 is positioned to cut normal to the length of the topcoat 90. In this figure, the topcoat 90 extends vertically at the point of trimming and, thus, the trim blade 96 is disposed horizontally. As will be appreciated, it is generally desirable to cut the top coat 90 normal to its length.

Once the topcoat 90 has been trimmed, the remaining free end 92 of the topcoat 90 can be wrapped around the trim panel 20 and secured thereto in a conventional manner. Often, the free end 92 is hand wrapped around the edge of the trim panel 20 and then secured thereto with a suitable adhesive, although other methods can be employed.

In FIG. 10, a second trim blade 98 is illustrated for cutting the topcoat 90 that has been applied to a sunshade trim panel 54. It will be appreciated that the trim blade in FIG. 10 is configured in a direction normal to the length of the topcoat 90, which in this figure is inclined relative to the trim blade 96 of FIG. 9. As will be appreciated, due to the different lengths of runoff of the topcoat 90, the trim blades 96 and 98 in FIGS. 9 and 10 are disposed at different angles in order to maintain a cut normal to the length of the topcoat 90 at the point of trimming. As with the topcoat in FIG. 9, once the topcoat in FIG. 10 is trimmed, the free end can be secured to the trim panel 54 with a suitable adhesive or by other means.

Although shown and described as two different trim blades, it will be appreciated that a single blade can be employed to make both cuts. In such an embodiment, the single trim blade would be repositioned depending on which trim panel is being trimmed.

It will now be appreciated that the present disclosure provides a trim panel design for a trim panel of a door of a vehicle that allows both sunshade and non-sunshade versions of the trim panel to be manufactured on the same equipment, thus eliminating the need to prepare separate molds for each trim panel. The trim panel design and vehicle door design with or without sunshade assembly provides a neat and streamlined appearance without having to prepare separate molds to produce multiple parts. This can result in cost saving and simplification of parts sourcing.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method of making a trim panel for an automobile door including a sunshade, and a trim panel for an automobile door not including a sunshade, from the same molding equipment, the method comprising the steps of:

molding a non-sunshade trim panel using a plastic mold apparatus having a hydraulic slide in a retracted position, the first trim panel having a body with first and second ends, a door side surface extending between the first and second ends, and a door upper surface extending away from the door side surface;

advancing the hydraulic slide to an extended position for producing a sunshade trim panel;

molding a sunshade trim panel using the plastic mold apparatus with the hydraulic slide in the extended position, the sunshade trim panel having a body with first and second ends, a door side surface extending between the first and second ends, and a door upper surface extending away from the door side surface;

wherein the door upper panel of the non-sunshade trim panel extends further from the door side surface than does the door upper surface of the sunshade trim panel.

2. The method as set forth in claim 1, further comprising the step of applying a top coat to at least one of the non-sunshade trim panel and the sunshade trim panel using a vacuforming press.

3. The method as set forth in claim 2, further comprising using the same vacuforming press to apply the top coat to both the non-sunshade and sunshade trim panels.

4. The method as set forth in claim 2, further comprising the step of trimming a free end of the top coat and securing the free end of the top coat to the trim panel.

5. The method as set forth in claim 1, further comprising the step of selecting one of the sunshade trim panel or the non-sunshade trim panel for installation on a door of a vehicle based on whether a sunshade is to be installed in the door.

6. A method of forming either a non-sunshade trim panel or a sunshade trim panel using the same equipment, both trim panels having a body with first and second ends, a door side surface extending between the first and second ends, and a door upper surface extending away from the door side surface, the door upper surface of the non-sunshade trim panel extending further from the door side surface than the door upper surface of the sunshade trim panel, the method comprising the steps of:

selecting either a non-sunshade trim panel or a sunshade trim panel for manufacture;

positioning a hydraulic slide of a molding press in a first or second position corresponding to the selected sunshade;

molding the selected sunshade;

applying a top coat to the molded sunshade using a vacuum form press, the vacuum form press adapted to apply a top coat to either of a non-shade trim panel or a sunshade trim panel;

trimming a free end of the top coat to a desired length; and securing the free end of the top coat to the molded trim panel.

7. A method as set forth in claim 6, wherein the step of molding the selected sunshade includes molding using an injection molding machine.

8. A method as set forth in claim 6, wherein the step of applying the top coat includes applying a foam layer and a vinyl layer to the molded sunshade.

9. The method as set forth in claim 1, wherein the molding a non-sunshade trim panel and the molding a sunshade trim panel both include forming a heat stake for securing a weatherstrip thereto.

10. The method of claim 1, wherein the advancing the hydraulic slide includes terminating a mold chamber prematurely, whereby the areal extent of the door upper surface of the sunshade trim panel is reduced.

11. The method of claim 5, further comprising installing the selected one trim panel on a door of a vehicle.

12. The method of claim 6, further comprising selecting one of the sunshade trim panel or the non-sunshade trim panel for installation on a door of a vehicle based on whether a sunshade is to be installed in the door.

13. The method of claim 12, further comprising installing the selected one trim panel on a door of a vehicle.

* * * * *